J. D. McCABE.
CUP FILLING DEVICE.
APPLICATION FILED DEC. 27, 1917.

1,296,300.

Patented Mar. 4, 1919.

WITNESSES

INVENTOR
Junius D. McCabe
BY
ATTORNEYS

UNITED STATES PATENT OFFICE.

JUNIUS DALLAS McCABE, OF CORAOPOLIS, PENNSYLVANIA.

CUP-FILLING DEVICE.

1,296,300.  Specification of Letters Patent.  Patented Mar. 4, 1919.

Application filed December 27, 1917. Serial No. 209,148.

*To all whom it may concern:*

Be it known that I, JUNIUS D. MCCABE, a citizen of the United States, and a resident of Coraopolis, in the county of Allegheny and State of Pennsylvania, have invented a new and Improved Cup-Filling Device, of which the following is a full, clear, and exact description.

This invention relates to cup filling devices and has for an object the provision of an improved simplified structure for filling groups of cups for any purpose simultaneously, and with an equal amount in each cup.

A further object in view is to provide an improved filling device for communion cups when arranged in their usual tray, the parts being so formed and arranged as to be capable of resting on the cups when in the tray during the filling operation.

A still further object of the invention is to provide a filling device which may be placed above the cups when arranged in a suitable holder with certain parts adjustably positioned for indicating to the operator the amount of filling at any time.

Figure 2:
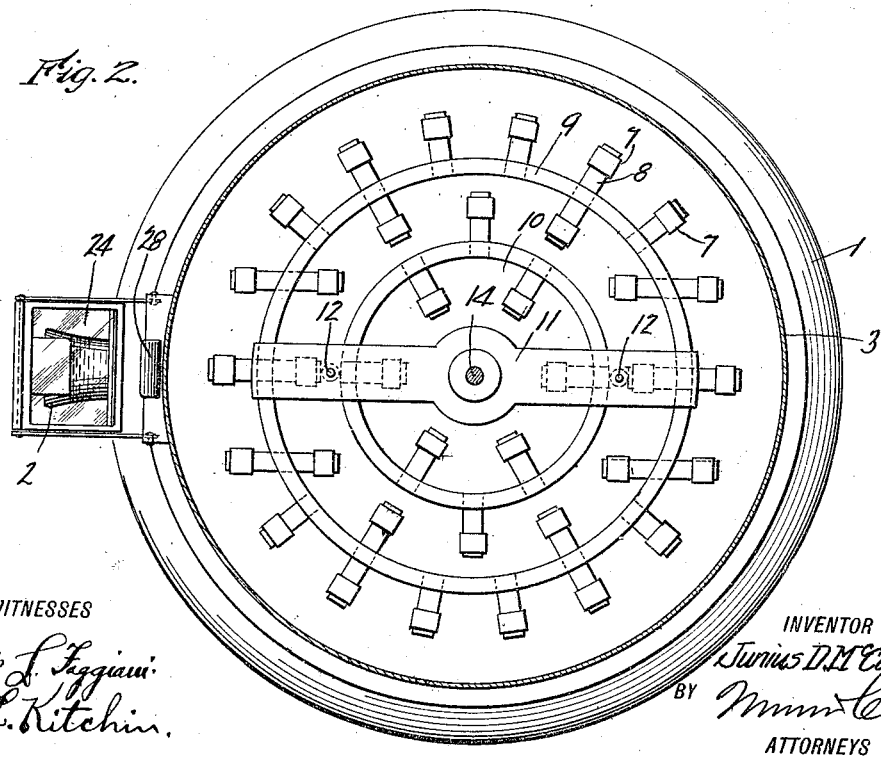
Fig. 2 is a horizontal section through Fig. 1 on line 2—2.

Referring to the accompanying drawing by numerals, 1 indicates conventionally a tray for receiving and properly holding the various cups or glasses 2 which are used in church services. The glasses 2 are comparatively small and where each glass is filled or partially filled individually much time is necessary where a large number are to be used to properly fill each glass to the same extent and to make the filling operation comparatively short a filling tank 3 is provided formed from any desired material, as for instance metal. The bottom 4 of tank 3 is provided with a plurality of apertures 5 formed of pressed up sections 6 at the bottom. These apertures are spaced an equal distance apart so as to be positioned centrally over the glasses 2 while the glasses are positioned in the tray 1. In forming the apertures 5 the bottom 4 is preferably stamped or pressed for forming upwardly extending projections 6, which projections are circular and perfectly sharp for biting into a gasket 7, which may be formed of rubber or any other desired material. This gasket may be in the form of a rubber band as shown, or some other form provided it is held in place properly. The various gaskets 7 are connected to supporting bars 8 which may be somewhat resilient, if desired double or single as shown in Fig. 2, and may be arranged at any desired angle so as to properly engage the respective projections 6. The various bars 8 are rigidly secured in any desired manner, as for instance by screws to the various rings 9 and 10, which rings in turn are rigidly secured by screws or otherwise to a frame or cross bar 11. The frame or cross bar 11 is provided with one or more apertures through which the pins 12 project, said pins being surrounded by springs 13 acting on bottom 4 and on frame 11 for giving a continuous tendency to said frame to move upwardly and thereby cause the gaskets 7 to move off of the projections 6, so as to uncover the apertures 5.

Figure 1:
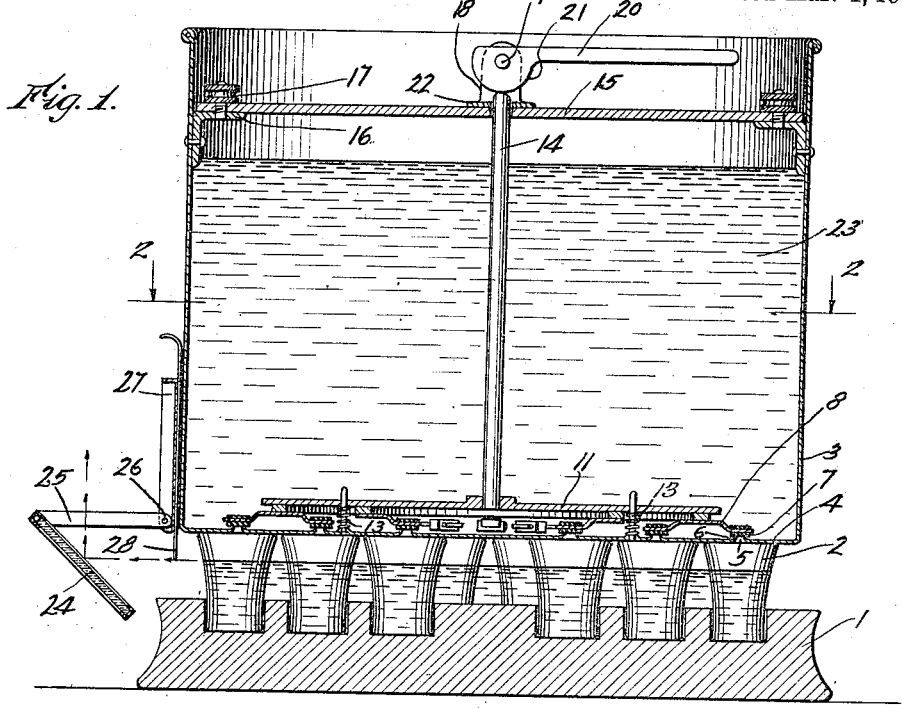
Figure 1 is a longitudinal vertical section through a filling device disclosing the invention.

By connecting all of the parts together as just described, whenever the frame 11 is raised or lowered all of the apertures 5 will be opened or closed simultaneously. The frame or bar 11 is rigidly secured to shaft 14, which shaft passes upwardly through a suitable aperture in the bracing bar 15, which bar is rigidly secured to the tank 3 in any desired manner, as for instance by reason of the brackets 16 and the clamping screws 17. Bar 15 carries one or more posts 18 which in turn support a shaft 19 passing through the end of lever 20, which lever is provided with a cam 21 acting on the top of shaft 14 in such a way as to force it downwardly and all the parts connected therewith. By reason of this shaft and the pins 12 the gaskets 7 are moved in a straight line away from and in a straight line toward the apertures 5 for simultaneously opening and closing the same. This simultaneous opening and closing is very desirable in order that all of the glasses 2 may be evenly filled. In order to easily ascertain when to shut off the flow of wine or other liquid 23, a mirror 24 is provided which is pivotally supported by a frame 25, which frame is supported at 26 in a casing 27. The parts are preferably made so that there is sufficient friction to hold the same in any position either folded or unfolded, whereby when the mirror is arranged as shown in Fig. 1 the operator may look directly downward and observe the contents of the glasses 2 as shown in Fig. 2. To be positive that a proper amount has been supplied a gage 28 is provided, which is slidingly mounted in back of the housing or casing 27, same being held in position in any suitable manner, as for instance by friction. As shown in Fig. 1 the glasses are approximately two thirds full, but if it should be desired to only supply enough to fill them half full the gage 28 would be moved downwardly until it is in a line horizontal with the center of the glasses and then the lever 20 operated. The arrangement of lever 20 and associate parts is such that one motion simultaneously uncovers the apertures and one motion closes the same, so that there will be an accurate filling of each glass.

What I claim is:

1. A cup filling device comprising a tank having a plurality of apertures in the bottom, a closure for each aperture, a plurality of rings, means for connecting said rings with said closures, a cross bar rigidly secured to said rings, an actuating pin connected with said bottom and extending through said bar, a spring acting on said bar for moving the same away from said bottom and consequently causing said closures to uncover said apertures, and manually actuated means for moving said bar and parts associated therewith so as to cause the closures to close said apertures.

2. The combination with a cup filling device, a mirror for observing the contents of the cups, means for adjustably supporting said mirror, and a gage coacting with the mirror and the cups for indicating the level of the liquid in the cups.

3. A cup filling device comprising a tank having apertures in the bottom formed with inwardly extending burs, a spider structure arranged in said tank, gasket members connected with said spider structure acting as closures, said gaskets being positioned to fit said burs, a pair of rods connected with said bottom and extending slidingly through said spider structure, a spring surrounding each of said rods and acting on the spider structure for raising the same so as to uncover said apertures, and a manually coacting member for moving said spider structure downwardly and locking the same against the action of said springs.

JUNIUS DALLAS McCABE.

Witnesses:
H. P. DAWSON,
EDWIN C. BOEHMIG.

Copies of this patent may be obtained for five cents each, by addressing the "Commissioner of Patents, Washington, D. C."